United States Patent
Tanaka

(10) Patent No.: US 6,735,768 B1
(45) Date of Patent: May 11, 2004

(54) METHOD AND SYSTEM FOR INSTALLING A SOFTWARE PRODUCT TO A COMPUTER WITH AUTHORIZATION

(75) Inventor: Mitsumasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/545,567

(22) Filed: Apr. 7, 2000

(30) Foreign Application Priority Data

Apr. 9, 1999 (JP) ............................................ 11-102368

(51) Int. Cl.[7] .............................................. G06F 9/445
(52) U.S. Cl. ........................................ 717/174; 717/168
(58) Field of Search ................................ 717/168–178; 713/189–194

(56) References Cited

U.S. PATENT DOCUMENTS

| | | | | |
|---|---|---|---|---|
| 5,923,885 A | * | 7/1999 | Johnson et al. | 717/176 |
| 5,926,631 A | * | 7/1999 | McGarvey | 703/23 |
| 6,044,154 A | * | 3/2000 | Kelly | 713/155 |
| 6,092,189 A | * | 7/2000 | Fisher et al. | 713/1 |
| 6,117,188 A | * | 9/2000 | Aronberg et al. | 717/176 |
| 6,272,536 B1 | * | 8/2001 | van Hoff et al. | 709/217 |

FOREIGN PATENT DOCUMENTS

| | | |
|---|---|---|
| JP | 8-84139 | 3/1996 |
| JP | 10-198569 | 7/1998 |

OTHER PUBLICATIONS

Sommerville et al. Configuration Language Support for Software Installation. IEEE. 1994. p. 209.*
Foster et al. The Installtion of Large–Scale EM Programs on Desktops. IEEE. 10/1–10/5.*
Rebello. How to Distribute Your Software Over the Web. IEEE. 1999. pp. 79–81.*

\* cited by examiner

*Primary Examiner*—Wei Y. Zhen
(74) *Attorney, Agent, or Firm*—Whitham, Curtis & Christofferson, P.C.

(57) ABSTRACT

A method and system for installing a software product to computer with authorization is provided. (1) A code C is generated from registration information that designates information about software products having already been installed to a first computer and an identifier that designates the software product S on both the first and the second computer. (2) A second computer compares the code $C_1$ generated by the first computer with the code $C_2$ generated by the second computer. And (3) if the code $C_1$ coincides with the code $C_2$, the software product S is installed to the first computer.

11 Claims, 6 Drawing Sheets

METHOD AND SYSTEM FOR INSTALLING A SOFTWARE PRODUCT TO A COMPUTER WITH AUTHORIZATION

BACKGROUND OF THE INVENTION

This invention relates to preventing unauthorized usage of a software product. This invention also relates to preventing usage of a software product by an unauthorized computer.

In recent years, there is a method of providing a software product in which a trial version of the software product is provided to its users at first. The trial version imposes limitations on its available term, function and so on.

When a user who has used the trial version hopes to use the complete version, the user asks the software supplier to sell the right to use the software product. After receiving the price of the right, the software supplier cancels the limitation in some way. There are many ways for canceling the limitation. One practical example of the ways is that: (1) the software supplier provides to users a complete version of which functions are partly inactive by locking a key as its trial version; (2) a user pays the price for the right to use the software product on one computer to the software supplier; (3) the user receives the key; and (4) the user unlocks the trial version by the key in order to cancel the limitation.

In the way like this example, however, a user who has received the key may cancel the limitation on plural computers and install the complete version into not only authorized computer but also unauthorized ones.

In order to solve this problem, Japanese Unexamined Patent Publication No. Hei 10-198569, namely, 198569/1998 shows a method that a host computer receives user information from a user computer and then generates, from the user information, a key available for resuming an installation into the user computer. In this method, the key is generated for each computer so that an unauthorized computer cannot resume the installation by the key.

Japanese Unexamined Patent Publication No. Hei 8-84139, namely. 84139/1996 shows a method that: (1) a user computer generates a key B from a timestamp and sends the key B to a host computer; (2) the host computer generates a key C from the key B and sends the key C to the user computer; (3) the user inputs the key C into the user computer during an installation process; and (4) the user computer generates a key D which permits the installation from the key C. In this method like the above-mentioned method, the key C is generated for each user computer and these methods restrict a user to install a software product into one computer.

Both of these methods merely restrict to install a software product. After installing the software product into a computer, all of the software product modules necessary for execution on the computer are stored into its storage device. Consequently, if a user copies all of the modules from an authorized computer to an unauthorized one, the user can run the software product on the unauthorized one.

Other security attempts have included a method that verifies whether an installed software product is authorized or not. In this method, a user computer generates registration information that denotes an authorized software product installed into the user computer, and then verifies the registration information when the user directs the user computer to execute the software product.

In this method, the registration information is composed of information about installed software products so that the registration information is easily analyzed and falsified as if a software product is installed into an authorized computer.

SUMMARY OF THE INVENTION

It is an object of this invention to provide a method of installing a software product only by a user authorized by a software supplier, and of preventing unauthorized usage by copying installed modules of the software product from an authorized computer to another computer.

According to the present invention, a method of installing 2 software product S to first computer with authorization by second computer is provided. This method comprises the steps of: (1) generating a code C from registration information that designates information about software products having already been installed to the first computer and an Identifier that designates the software product S on both the first and the second computer; (2) comparing the code $C_1$ generated by the first computer with the code $C_2$ generated by the second computer, and (3) installing the software product 5 to the first computer if the code $C_1$ coincides with the code $C_2$ is provided.

The software product S may be functionally limited by a lock unlocked by the use of a key code K and comprise; further generating a code D by performing an operation P which is determined from the code $C_2$ to the key code K at STEP (1); generating a code K' by performing an operation Q which is the inverse operation of the operation P and determined from the code $C_1$ to the code D instead of STEP (2); and installing the software product S to the first computer if the key code K' successfully unlocks the lock on the software product S instead of STEP (3).

The software product S may be locked by encrypting a part or the whole of the software product. In this case, the encrypted software product is decrypted with the key code K.

The registration information may comprise an identifier which is assigned to-a software product which has already been installed to the first computer, together with the code C generated for installing the software product The identifier may be a timestamp designating the time when the first computer is directed installation of the software product S.

The first computer may be used by the buyer of the software product S and the second computer is used by the supplier of the software product S.

Further, according to the present invention, a system for installing a software product S to first computer with authorization by second computer is provided. In the system, the first computer comprises: a first generator for generating a code $C_1$ from registration information that designates information about software products having already been installed to on the first computer and an identifier that designates the software product S in the first computer; a comparator for comparing the code $C_1$ generated by the first computer with the code $C_2$ generated by the second computer; and an installer for installing the software product S to the first computer if the comparator judges that the $C_1$ coincides with $C_2$. The second computer comprises a second generator for generating a code $C_2$ from the registration information and the identifier in the second computer.

The software product S may be functionally limited by a lock unlocked by the use of a key code K. In this case, the first generator further generates a code D by performing an operation P which is determined from the code $C_2$ to the key code K. The second generator generates a code K' by performing an operation Q which is the inverse operation of the operation P and determined from the code $C_1$ to the code D. The installer installs the software product S to the first computer if the key code K' successfully unlocks the lock on the software product S.

The software product S may be locked by encrypting a part or the whole of the software product. In this case, the first computer further comprises a decryption unit for decrypting the encrypted software product with the key code K.

The registration information may comprise an identifier. The identifier is assigned to a software product that has already been installed to the first computer, together with the code C generated for installing the software product.

The identifier may be a timestamp designating the time when the first computer is directed installation of the software product S.

DESCRIPTION OF THE PREFERRED EMBODIMENTS

Figure 1:
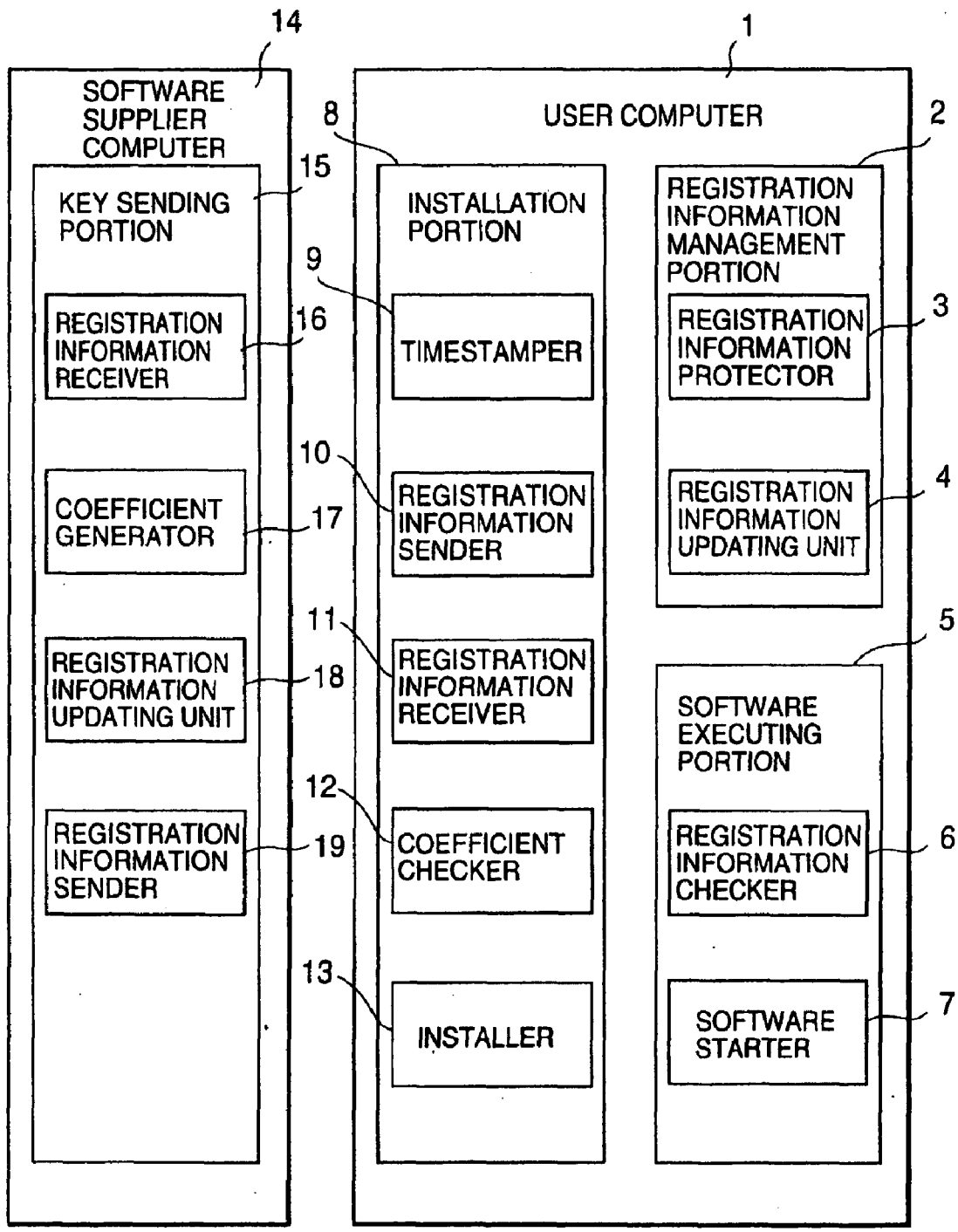
FIG. 1 shows a software block diagram for use in describing a user computer and a software supplier computer of an embodiment of this invention.

Description will be made about an embodiment of this invention. As shown in FIG. 1 this embodiment comprises a user computer 1 and a software supplier computer 14 and these computers are featured by software blocks in FIG. 1. The user computer 1 is used by a user and comprises a registration information management portion 2 which manages registration information recorded in the user computer 1, a software executing portion 5 which manages starting of software products, and installation portion 8 which manages installation of software products. The software supplier computer 14 is used by a software supplier and comprises key sending portion 15.

Figure 2:
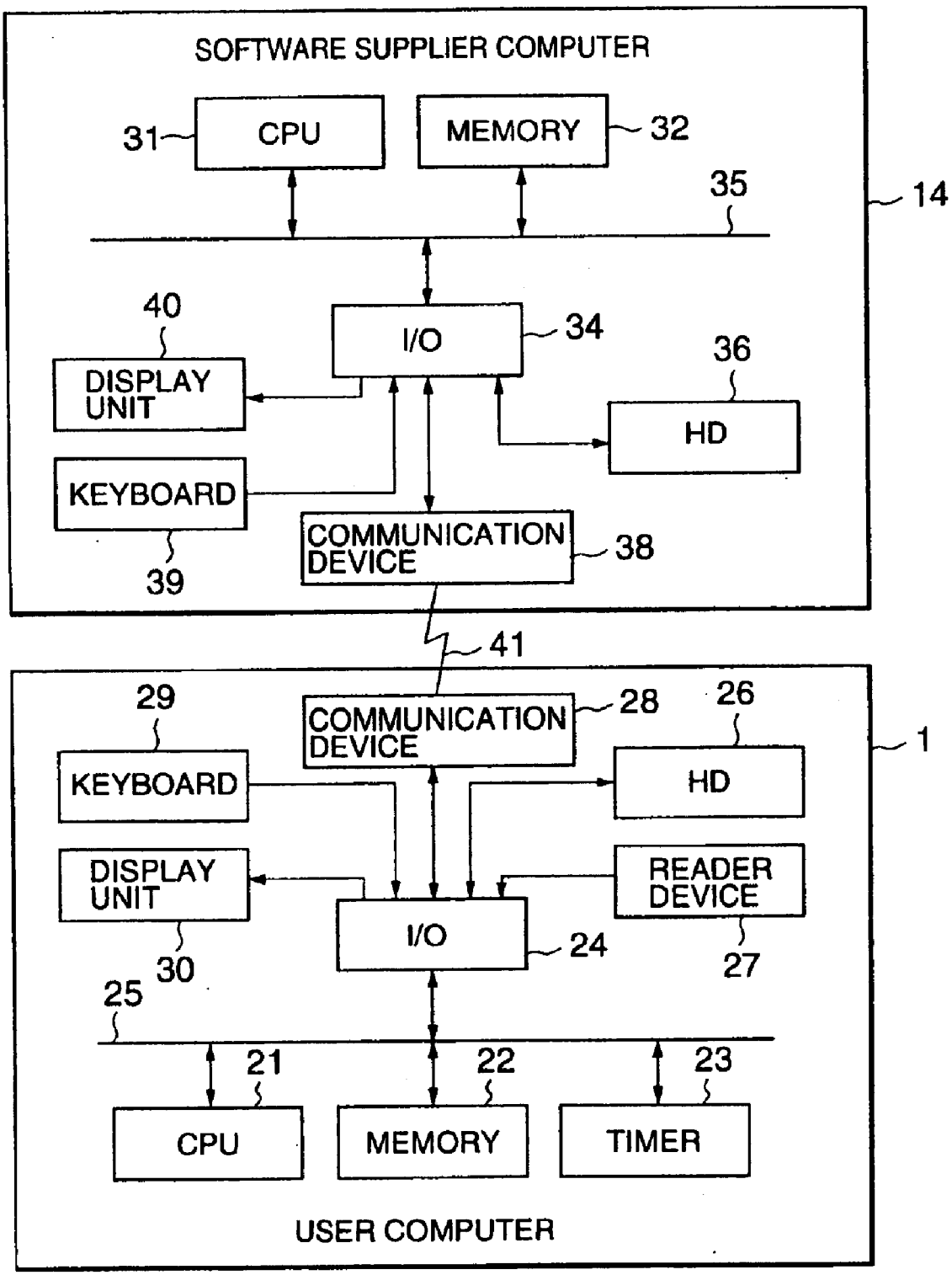
FIG. 2 shows a hardware block diagram for use in describing the user computer 1 and the software supplier computer.

As shown in FIG. 2, the user computer 1 is specified by and comprises a central processing unit (CPU) 21, a memory 22, a timer 23, an input/output interface (I/O) 24, a common bus 25, a non-volatile storage device 26, a reader device 27, a communication device 28, a keyboard 29 and a display unit 30. The common bus connects with the CPU 21, memory 22, timer 23 and I/O 24 with each other to communicate between these blocks. The non-volatile storage device 26, reader device 27, communication device 28, keyboard 29 and display unit 30 are connected with the I/O 24.

The CPU 21, memory 22, I/O 24, common bus 25, keyboard 29 and display unit 30 are generally known by one skilled in the art so that description about these blocks is omitted.

The timer 23 provides the user computer 1 with timestamp. In this embodiment, a timestamp has a format composed of a fourteen-digit integral number (four-digit year, two-digit month, two-digit date, two-digit hour in the range 00 to 24, two-digit minute and two-digit second). The timestamp may have other format. For example, the format may include five-digit second given in milliseconds. Otherwise, the format may include an integral number expressing elapsed time from a specific time, instead of local time of specific area.

The non-volatile storage device 26 is a readable/writable non-volatile storage device such as a hard disk (HD) and a flash memory, and is installed with the software products. The reader device 27 such as a CD-ROM drive is to read a recording medium that stores a software product and is supplied by a software supplier. Henceforth, the non-volatile storage device 26 is referred to as a HD 26 and the reader device 27 is referred to as a CD-ROM drive 27.

The communication device 28 is connected with a communication device 38 of the software supplier computer 14 via a communication line 41. This connection can serve to carry out data communication between the user computer 1 and the software supplier computer 14.

The programs shown in FIG. 1, corresponding to the registration information management portion 2, the software execution portion 5 and the installation portion 8 are stored in the HD 26. When the user computer 1 is turned on, an operating system (OS) is loaded from HD 26 to memory 22 and the OS starts. Then, the programs are loaded from the HD 26 to memory 22 as resident programs.

As shown in FIG. 1, the registration information management portion 2 comprises a registration information protector 3 which protects registration information from falsification, and a registration information updating unit 4 which updates registration information if a software product has been installed to an authorized computer.

The software executing portion 5 comprises a registration information checker 6 which analyzes registration information to check whether a software product is installed to an authorized computer or not before executing the software product.

The installation portion 8 comprises a timestamper 9, a registration information sender 10, a registration information receiver 11, a coefficient checker 12 and an installer 13. The timestamper 9 acquires current timestamp relating to the start of installing a software product. The registration information sender 10 sends, to the software supplier computer 14, software information comprising a name of a software product and a timestamp and registration information of the user computer 1. The registration information receiver 11 receives registration information comprising a coefficient code that is generated for installation to an authorized computer.

As shown in FIG. 2, the software supplier computer 14 comprises a CPU 31, a memory 32, an I/O 34, a common bus 35, a non-volatile storage device (LD) 36, a communication device 38, a keyboard 39, and a display 40. The common bus 35 connects the CPU 31, the memory 32 and the I/O 34 with each other to communicate between these blocks. The non-volatile storage device (HD) 36, the communication device 38, the keyboard 39 and the display 40 are connected to the I/O 34.

The non-volatile storage device 36 may be-a readable/writable non-volatile storage device such as a HD and a flash memory. The communication device 38 is connected with a communication device 28 of the user computer 1 via the communication line 41 This connection can serve to carry out data communication between the user computer 1 and the software supplier computer 14.

The programs shown in FIG. 1, corresponding to the key sending portion 15 are stored in the HD 36. When the software supplier computer 14 is turned on, an OS is loaded from HD 36 to memory 32 and the OS starts. Then, the program is loaded from the HD 36 to memory 32 as a resident program.

The key sending portion 15 comprises a registration information receiver 16, a coefficient generator 17, a registration information updating unit 18 and a registration information sender 19.

The registration information receiver 16 receives the software information and the registration information from the user computer 1. The coefficient generator 17 generates a coefficient code from the software information and the registration Information, and then merges the coefficient code with a key code which is used for canceling limitation on a software product. The registration information updating unit 18 records the received software information and the generated coefficient code in updated registration information. The registration information sender 19 sends the updated registration information to the user computer 1.

Figure 3:
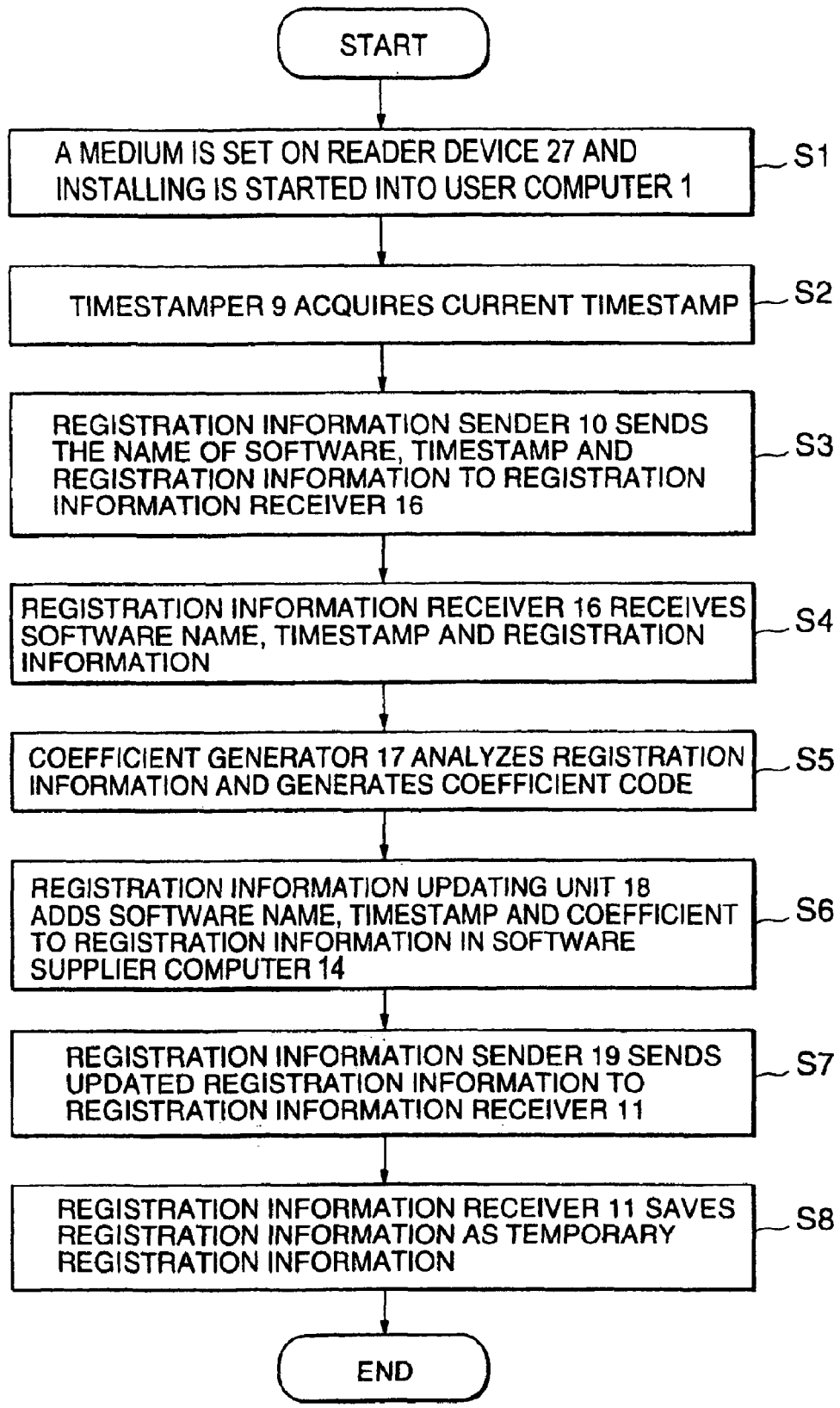
FIG. 3 shows a flow chart for use in describing procedure that the software supplier computer 14 authorizes the user computer.

Next, description below will be made about a process that the user computer 1 receives the key code from the software supplier computer 14 with reference to FIG. 3 A part/the whole of functions of the software product is locked by a key code to make the locked function(s) unavailable. In this description, the user computer 1 and the software supplier computer 14 have already been connected with the communication line 41.

STEP S1: A user intends to buy a software product stored in a recording medium and install the software product to a user computer 1. The user sets the recording medium to CD-Rom Drive 27 and commands the user computer 1 to start installation of the software product.

STEP S2: The timestamper 9 acquires current timestamp from the timer 23.

STEP S3: The registration information sender 10 sends the name of the software product input at STEP Si, the timestamp acquired at STEP S2 and registration information currently stored in the HD 26 to the software supplier computer 14. The current registration information includes a coefficient code for a software product that has already been installed into the user computer 1.

STEP S4: The registration information receiver 16 receives the name of the software product, the timestamp and the registration information from the user computer 1.

STEP S5: The coefficient generator 17 analyzes the registration information received at STEP S4 and retrieves predetermined part of the registration information. In this embodiment, the predetermined part may be the coefficient code of the latest installed software product to the user computer 1 in the received registration information. And then, the coefficient generator 17 utilizes the latest coefficient code and the timestamp acquired at STEP S2 to generate a new coefficient code corresponding to the software product designated at STEP S1. Further, the coefficient generator 17 merges the new coefficient code and the key code for unlocking the software product's function(s) into a code that is called mixture code below.

STEP S6: The registration information updating unit 18 adds the new coefficient code generated at STEP S5, the name of software product and the timestamp to the registration information stored in the HD 36.

STEP S7: The registration information sender 19 sends the registration information updated at STEP S6 to the registration information receiver 11.

STEP S8: The registration information receiver 11 saves the received registration information at STEP S7 as a temporary registration information to the HD 26.

Figure 4:
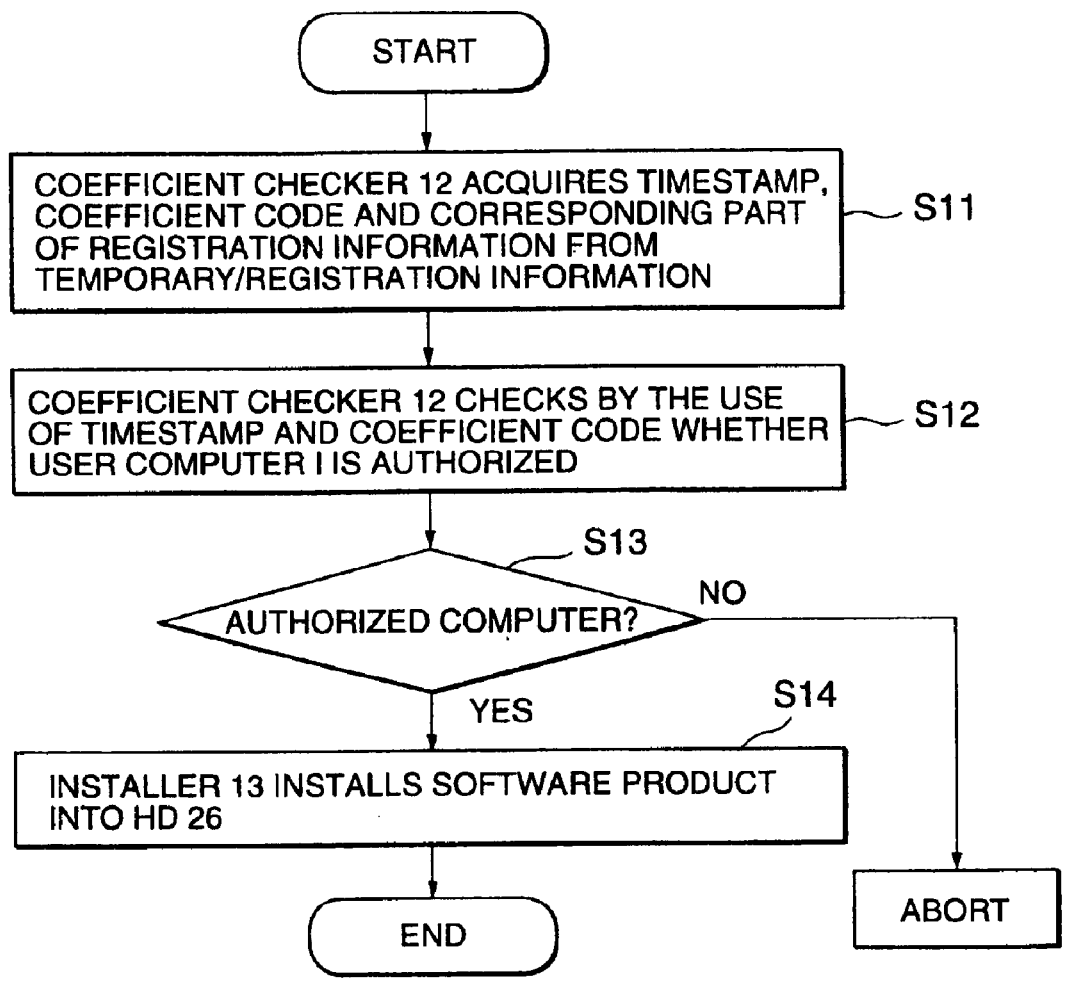
FIG. 4 shows a flow chart for use in describing procedure that the user computer 1 installs a software product.

Next, description below will be made about a process that a software product is installed into the user computer 1 with reference to FIG. 4.

STEP S11: The coefficient checker 12 analyzes the registration information recorded in the user computer 1 or the temporary registration information to acquire the timestamp of the objective software product and two coefficient codes. The first one of the coefficient codes is of the objective software product. The second one of the coefficient codes is generated from the timestamp and the first one of the coefficient codes.

STEP S12: The coefficient checker 12 confirms whether the user computer 1 has been authorized by the software supplier or not by referring to the timestamp and two coefficient codes acquired at STEP S11.

STEP S13: The coefficient checker 12 judges the result of STEP S12. If the user computer 1 is judged as an authorized one, STEP S14 follows STEP 13. If the user is judged as an unauthorized one, the process is aborted.

STEP S14: The installer 13 starts to install the software product to the HD 26.

Next, description will be made about a process that a software product is executed on the user computer 1 with reference to FIG. 5.

STEP S21: The registration information checker 6 analyzes the registration information or the temporary registration information to acquire the timestamp of the objective software product and two coefficient codes. The first one of the coefficient codes is of the objective software product. The second one of the coefficient codes is generated from the timestamp and the first one of the coefficient codes.

STEP S22: The registration information checker 6 confirms whether the user computer 1 has been authorized by the software supplier or not by referring to the timestamp and two coefficient codes acquired at STEP S21.

STEP S23: The registration information checker 6 judges the result of STEP S22. If the user computer 1 is judged as an authorized one, STEP S24 follows. If the user is judged an unauthorized one, the process is aborted.

STEP S24, The software starter 7 execute the software product.

Next, description will be made about a process from buying a software product through installing the software product with detailed embodiment.

Figures 5, 6:
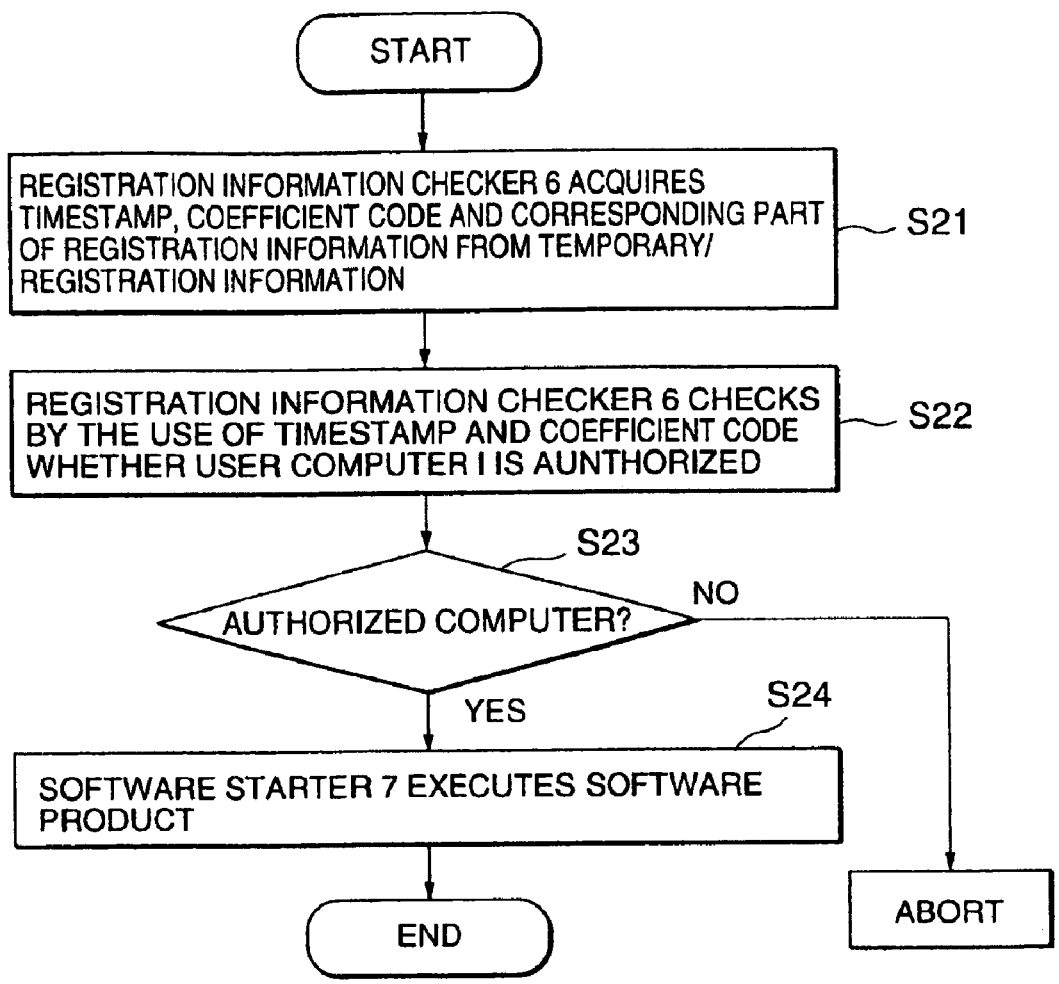
FIG. 5 shows a flow chart for use in describing procedure that the user computer 1 starts the installed software product.
FIG. 6 shows an example of a registration information table.

Shown in FIG. 6, is the registration information in temporary storage for the user computer 1. In the following description, a software product "GraphEdt" denoted by registration number M is installed into the user computer 1. In this description, the user computer 1 and the software supplier computer 14 have already been connected with the communication line 41.

The software product "GraphEdt" is provided to its users with limitation on its functions. This limitation is cancelled with a key code corresponding to the software product. Without the key code, the user cannot use the software product partly or at all.

For one example of the limitation and the key code, a password is assigned and a part of the functions of the software product are locked with the password. When the user installs the software product with entire functions, the password is requested by the user computer 1 and provided by the supplier computer 14. In this case, the password corresponds to the key code.

For another example, the software product is encrypted with an encryption algorithm. The encryption algorithm is decrypted with a decryption key. In this case, the decryption key corresponds to the key code.

STEP S1. A user intends to buy a software product stored in a CD-ROM and install the software product to a user computer 1. The user sets the CD-ROM to a CD-ROM drive 27 and commands the user computer 1 to start installation of the software product.

STEP S2: The timestamper 9 acquires current timestamp (AD1998, December 10th, 15:10:25) from the timer 23.

STEP S3, The registration information sender 10 sends current registration information, timestamp "19981210151025", and software name "GraphEdt" to the software supplier computer 14. The current registration information comprises the software names, timestamps and coefficient codes from registration number 1 to M-1.

STEP S4: The registration information receiver 16 receives the current registration information, timestamp "19981210151025", and software name "GraphEdt" from the user computer 1.

STEP S5: The coefficient generator 17 analyzes the registration information received at STEP 84 and retrieves the coefficient code "XXXXXXXXXXXXXX" of the latest installed software product "WordProc". Then, the coefficient generator 17 operates the coefficient code "XXXXXXXXXXXXXX" and the timestamp "19981210151025" to generate a new coefficient code "YYYYYYYYYYYYYY" corresponding to the registration number M. Addition, subtraction and other arithmetic/logical operation may be applicable for the operation to the coefficient code and the timestamp. Further, the coefficient generator 17 merges the new coefficient code and the key code of the software product into a mixture code.

STEP S6: The registration information updating unit 18 adds the coefficient code "YYYYYYYYYYYYYY", the name of software product "GraphEdt" and the timestamp "19981210151025" to the registration information stored in the HD 36.

STEP S7. The registration information sender 19 sends the registration information updated at STEP S6 to the registration information receiver 11.

STEP S8: The registration information receiver 11 saves the registration information received at STEP S7 as a temporary registration information to the HD 26.

STEP S11: The coefficient checker 12 in the user computer 1 searches for the temporary registration information. If the temporary registration information exists in the user computer 1, the coefficient checker 12 acquires the coefficient code "YYYYYYYYYYYYYY" of "GraphEdt" with reference to the registration number M from the temporary registration information if the temporary registration information does not exist in the user computer 1, the coefficient checked 12 acquires these information from the registration information. To detect whether the software product "GraphEdt" is registered in the temporary/registration information or not, it may be able to search for either the name "GraphEdt" or to search for its registration number M.

STEP 312: The coefficient checker 12 confirms whether the user computer 1 has been authorized by the software supplier or not. To confirm authorization, the coefficient-checker 12 process the coefficient code "YYYYYYYYYYYYYY" and the timestamp "19981210151025" to generate a code. This processing is inverse processing carried out at STEP S5 to generate a new coefficient code. For examples when the operation at STEP S5 is addition, the operation at STEP 12 is subtraction.

STEP S13: The coefficient checker 12 compares the key generated at STEP S12 with the coefficient key "XXXXXXXXXXXXXX" of the registration number M-1 in the temporary/registration Information.

STEP S14: When the key generated at STEP S12 coincides with the coefficient key "XXXXXXXXXXXXXX", the user computer 1 is judged as an authorized one and the installer 13 starts to install the software product to the HD 26.

When the key generated at STEP S12 does not coincide with the coefficient key "XXXXXXXXXXXXXX", the user computer 1 is judged as an unauthorized one and the installer 13 does not work.

When the user directs the user computer 1 to execute the software product "GraphEdt", the registration information checker 6 in the user computer 1 searches for the temporary registration information. If the temporary registration information is searched out, the registration information checker 6 acquires the coefficient code "YYYYYYYYYYYYYY" of "GraphEdt" from the temporary registration information with reference to its registration number M If the temporary registration information is not searched out, the registration information checker 6 acquires the code from the registration information, To detect whether the software product "GraphEdt" registers the temporary/registration information or not, it may be available either to search for the name "GraphEdt" or its registration number M.

STEP S22: The registration information checker 6 confirms whether the user computer 1 has been authorized by the software supplier or not. To confirm authorization, the coefficient checker 12 processes the coefficient code "YYYYYYYYYYYYYY" and the timestamp "19981210151025" to generate a code. This processing is inverse processing carried out at STEP S5 to generate a new coefficient code. For example, when the processing at STEP S5 is addition, the processing at STEP 12 is subtraction.

STEP S23: The registration information checker 12 compares the key generated at STEP S22 with the coefficient key "XXXXXXXXXXXXXX" of the registration number M-1 in the temporary/registration information.

STEP S24: When the key generated at STEP S22 coincides with the coefficient key "XXXXXXXXXXXXXX", the user computer 1 is judged as an authorized one and the software starter 7 starts to execute the software product "GraphEdt".

When the key generated at STEP S22 does not coincide with the coefficient key "XXXXXXXXXXXXXX", the user computer 1 is judged as an unauthorized one and the software starter 7 does not work.

In this embodiment, the communication line 41 connects the user computer 1 and the software supplier computer 14 with each other in order that the software supplier provides a coefficient code to the user. However, the present invention is not limited to this embodiment. For example, it may be available for sending a coefficient code to the user that: (1) the user sends the recording medium on which is recorded the software information and the registration information to the software supplier; (2) the software supplier generates a new coefficient code and updates the registration information; and (3) the software supplier sends the recording medium recorded with the updated registration information back to the user.

Further, in this embodiment, the software product is provided to the user via a recording medium storing the software product. However, the software product may be provided to the user via transmission medium. For example, the software product may be transmitted from the software supplier computer 14 through the communication line 41 and directly installed by the software supplier computer 14.

Further, in this embodiment, a new coefficient code is generated from the latest coefficient code. However, a new coefficient code may be generated from plural coefficient codes in the registration information.

A new coefficient code in updated registration information relates to one or plural coefficient codes in the latest registration information in order to generate the new coefficient code. This relationship in the user computer 1 should coincide with that in the software supplier computer 14. In this embodiment, a new coefficient code relates to the latest coefficient code in the latest registration information However, the present invention is not limited to this embodiment. For example, the software supplier computer 14 may designate the relationship and send it to the user computer 1.

Further, in this embodiment, the software supplier computer 14 merely executes generation and transmission of coefficient codes. However, the software supplier computer 14 may save updated registration information for reissuing registration information when the user computer 1 has lost its registration information. Also, the software supplier computer 14 may register the user of the software product for customer management of the software product.

Figure 7:
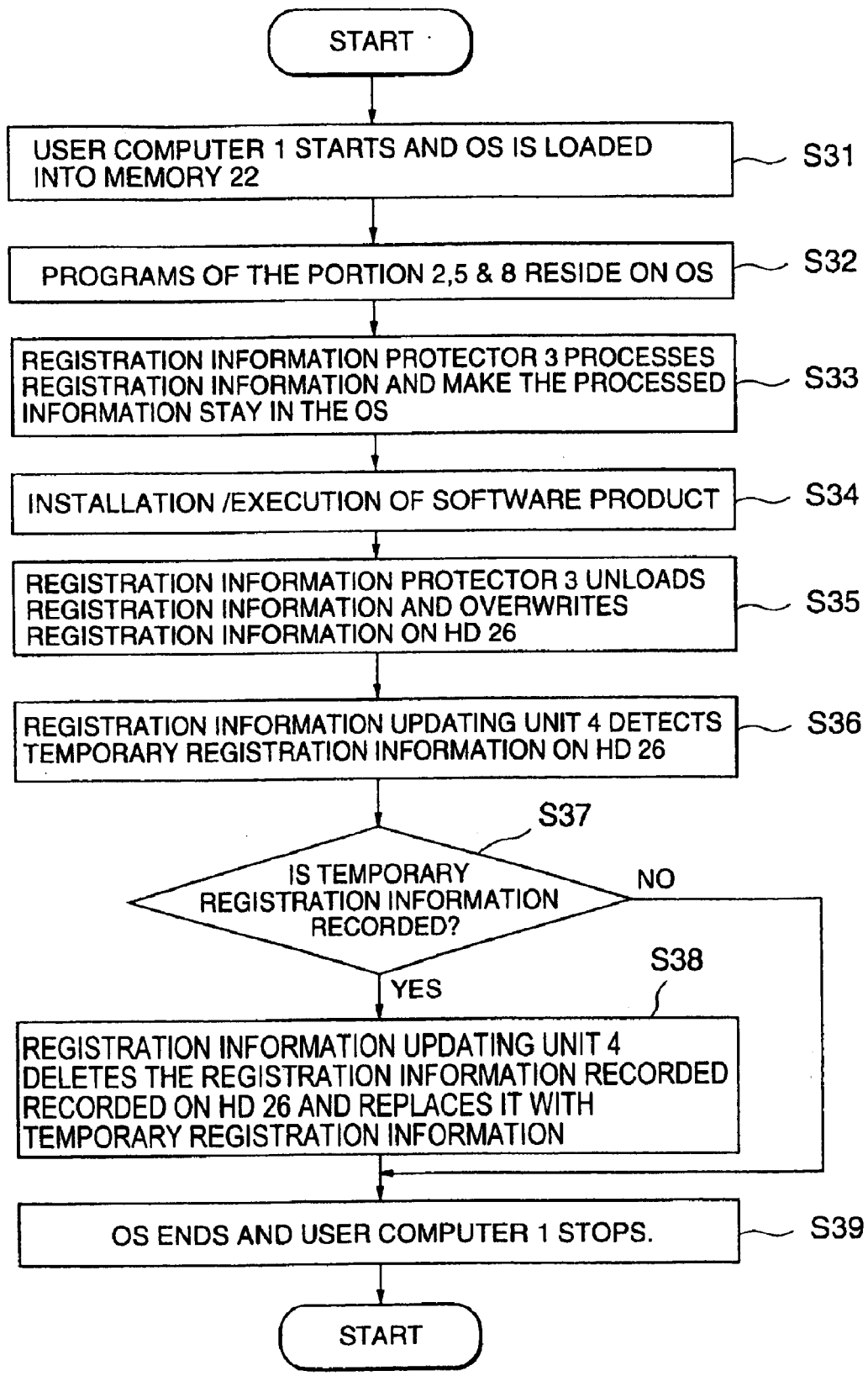
FIG. 7 shows flow chart for use in describing procedure of the user computer 1 manages starting of an installed software product.

Next, description will be made about a process for restricting falsification of registration information in above-mentioned embodiment with reference to FIG. 7.

STEP S31: When the user turns on the user computer 1, the user computer 1 starts its OS.

STEP S32: The programs corresponding to the registration information management portion 2, the software execution portion 5 and the installation portion 8 are loaded from the HD 26 to memory 22 as resident programs.

STEP S33: The registration information protector 3 reads the registration information of the user computer 1 from the HD 26 and the registration information resides on the OS. To reside on the OS, the registration information may have an implementation form in order to be available immediately after the OS starting. Otherwise, the registration information may be implemented a as part of the OS.

STEP S34: The user computer 1 executes various kinds of processes according to the direction of the user.

STEP S35: When the registration information protector 3 receives a direction for ending the OS, the registration information protector 3 unloads the registration information and overwrites the unloaded registration information onto the registration information recorded on the HD 26

STEP S36: The registration information updating unit 4 searches the HD 26 for temporary registration information.

STEP S37: If the temporary registration information exists, STEP S38 follows. If the temporary registration information does not exist, STEP S39 follows.

STEP S38: The registration information on the HD 26 is deleted and the resident registration information is recorded on the HD 26. The registration information management portion 2, the software executing portion 5 and the installation portion 8 may be incorporated in the OS. In this case, it will be more difficult to find the way of unlocking restriction on the software product and to analyze registration information.

STEP 39: The OS ends and the user computer 1 stops.

Thus, a coefficient code disappears from the user during installing a software product, so that the user cannot get the coefficient code itself. As a result, the user cannot install the software product without authorization by the software supplier.

Further, even if a user copies all of program modules of the software product from an authorized computer to an unauthorized one, the registration information of the unauthorized one does't include the software information and the coefficient code corresponding to the software product. As a result, the unauthorized computer cannot execute the software product.

Further, when a user discovers the existence of registration information and copies that from an authorized computer to an unauthorized one, the user can install the software product to the unauthorized one. However, when the unauthorized one stops, the copied registration information is deleted. As a result, the unauthorized computer cannot execute the software product next time.

Further, if a user avoids deleting registration information from an unauthorized computer to turn off the unauthorized computer after copying the registration information from an authorized one to the unauthorized one, the copied registration information is incompatible with actually installed software products in the unauthorized computer. As a result, the unauthorized computer cannot execute the other software products.

And further, a user might acquire name of software product, timestamp and coefficient code corresponding to a target software product by analyzing the registration information of an authorized computer. And then, the user might add the name of software product, the timestamp and the coefficient code to the registration information of an unauthorized computer However, to execute the target software product on the unauthorized computer the user has to know the coefficient code which is related to the coefficient code of the target software product. And further, the user has to falsify the related coefficient code Though it is hardly able to discover the relationship between coefficient codes.

The user might discover the related coefficient code corresponding to another software product. The software product will be called a second target software product below. In this case, the user has to falsify the coefficient code related with that of the second target software product. Or else, the user cannot execute the second target software product.

In these ways, this invention is effective in preventing falsification of coefficient code, and consequently, unauthorized usage of software product. Especially, when a coefficient code of a target software product is related with a coefficient code of a module that is implemented in OS to be frequently executed, this invention is more effective because the module is unavailable and OS hardly works when registration information has been falsified. Consequently, a user who copies a software product to an unauthorized computer cannot execute the software product on the computer so that this invention prevents unauthorized usage of software product.

As mentioned above, in this invention, a coefficient code of a new software product that Is to be installed to a user computer is related with that of other software product that has already installed to the user computer in order to generate the coefficient code of the new software product. In general, the kinds of software products installed to computers are different from each other. Thus, one coefficient code generated for one computer is unavailable for installing the software product to the other computer.

Further, in this invention, a coefficient code for a software product is recorded as registration information of the software product. When the software product is executed, the software has to refer to the registration information. Consequently, a computer which is to execute a software product reliably judges whether the computer is authorized or not and stops executing the software product when the software product is unauthorized for the computer.

And further, in this invention, a coefficient code of a software product is related with timestamp, which designates the time when the software product is installed, and singular/plural other coefficient codes. A software product whose registration information has been falsified becomes inoperable. When a coefficient code of a software product is related with a coefficient code of a frequently operable module of OS, this invention can stop OS from working. Consequently, this invention prevents unauthorized usage of a software product.

While this invention has thus far been described in conjunction with a embodiment thereof, it will be readily possible for those skilled in the art to put this invention into various other manners.

What is claimed is:

1. A method of installing a software product S to first computer with authorization by second computer, comprising the steps of:

(1) generating a code $C_1$ on a first computer from registration information that designates information about software products having already been installed to the first computer and an identifier that designates the software product S on both the first and a second computer and generating a code $C_2$ on the second computer using the registration information received from the first computer;

(2) comparing the code $C_1$ generated by the first computer with the code $C_2$ generated by the second computer; and (3) installing the software product S to the first computer if the code $C_1$ coincides with the code $C_2$.

2. A method as claimed in claim 1, wherein the software product S is functionally limited by a lock unlocked by the use of a key code K, comprising;

further generating a code D by performing an operation P which is determined from the code $C_2$ to the key code K at STEP (1);

generating a code K' by performing an operation Q which is the inverse operation of the operation P and determined from the code $C_1$ to the code D instead of STEP (2); and installing the software product S to the first computer if the key code K' successfully unlocks the lock on the software product S instead of STEP (3).

3. A method as claimed in claim 2, wherein:

the software product S is locked by encrypting a part or the whole of the software product; and the encrypted software product is decrypted with the key code K.

4. A method as claimed in claim 1, wherein the registration information comprises an identifier which is assigned to a software product which has already been installed to the first computer, together with the code C generated for installing the software product.

5. A method as claimed in claim 1, wherein the identifier is a timestamp designating the time when the first computer is directed installation of the software product S.

6. A method as claimed in claim 1, wherein the first computer is used by the buyer of the software product S and the second computer is used by the supplier of the software product S.

7. A system for installing a software product S to first computer with authorization by second computer, wherein the first computer comprises:

a first generating means for generating a code $C_1$ from registration information that designates information about software products having already been installed to the first computer and an identifier that designates the software product S in the first computer;

a comparing means for comparing the code $C_1$ generated by the first computer with a code $C_2$ generated by the second computer; and an installing means for installing the software product S to the first computer if the comparing means judges that the $C_1$ coincides with $C_2$, and the second computer comprises:

a second generating means for generating a the code $C_2$ using the registration information received from the first computer and the identifier in the second computer.

8. A system as claimed in claim 7, wherein:

the software product S is functionally limited by a lock unlocked by the use of a key code K;

the first generating means further generates a code D by performing an operation P which is determined from the code $C_2$ to the key code K;

the second generating means generates a code K' by performing an operation Q which is the inverse operation of the operation P and determined from the code $C_1$ to the code D; and the installing means installs the software product S to the first computer if the key code K' successfully unlocks the lock on the software product S.

9. A system as claimed in claim 8, wherein:

the software product S is locked by encrypting a part or the whole of the software product; and the first computer further comprises a means for decrypting the encrypted software product with the key code K.

10. A system as claimed in claim 7, wherein the registration information comprises an identifier which is assigned to a software product which has already been installed to the first computer, together with the code C generated for installing the software product.

11. A system as claimed in claim 7, wherein the identifier is a timestamp designating the time when the first computer is directed installation of the software product S.

* * * * *